June 21, 1938.  E. S. CORNELL, JR  2,121,753
WINDOW DEFROSTER
Filed Sept. 27, 1935   2 Sheets-Sheet 1

INVENTOR
Edward S. Cornell, Jr.
BY
HIS ATTORNEY

June 21, 1938.  E. S. CORNELL, JR  2,121,753
WINDOW DEFROSTER
Filed Sept. 27, 1935  2 Sheets-Sheet 2
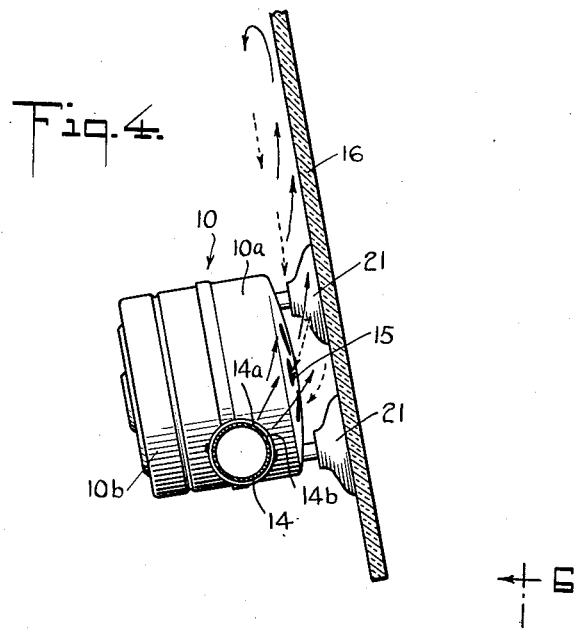
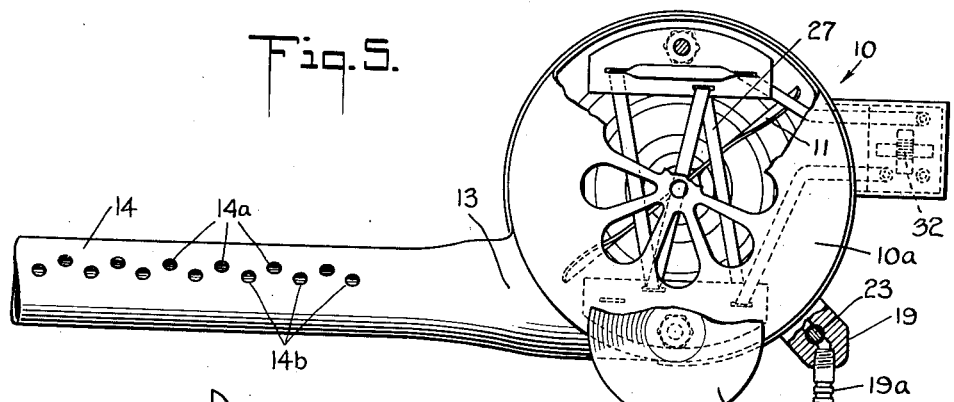
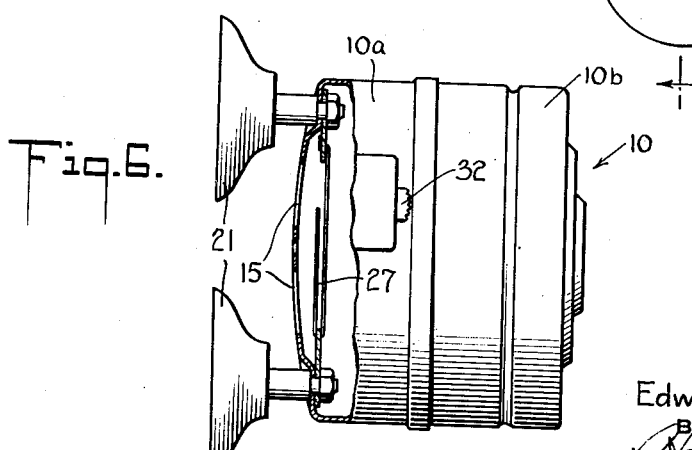
INVENTOR
Edward S. Cornell, Jr.
BY
HIS ATTORNEY Patented June 21, 1938

2,121,753

UNITED STATES PATENT OFFICE 2,121,753

WINDOW DEFROSTER

Edward S. Cornell, Jr., Larchmont, N. Y., assignor to American Radiator Company, New York, N. Y., a corporation of New Jersey Application September 27, 1935, Serial No. 42,379

2 Claims. (Cl. 20—40.5)

The invention relates to window defrosters.

More particularly, my present invention is directed to unitary means for removing from glass vapor, frost, and/or other condensation. By the term "glass" I include the glass constituting the windshield of an automobile, the glass of a door of an automobile or other form of self-propelled vehicle, and the like. By the term "frost" and its derivatives, I include the above and other varied forms of condensation, usually tending to obscure vision.

Commercial embodiments of my present invention are represented by unitary devices, each comprising an apertured member constructed to receive and transmit air under compression and discharge the same in predetermined path of flow, an air compressor, a motor for actuating the compressor and casing means for housing the stated parts, the casing means including or arranged for coordination with suitable means for attaching and/or supporting the stated assembly as a unit relative to the surface of the glass to be treated.

Desirably, for use with an automobile employing an internal combustion engine as its tractive motor, the motor of my defroster may be of the air propelled type, advantageously operated under sub-atmospheric pressure by connection through suitable tube means with the intake manifold of the tractive motor. However, the motor of my defroster may be operated by compressed air from any suitable source, or may be electrically driven by energy from the storage battery or other electrical source, or otherwise suitably energized. Advantageously, the compressor is of the rotary type, thereby attaining simplification of structure with attendant reduced overall dimensions, and also efficiency of operation by a rotary type of motor. The compressed air may be heated, as by means of a suitable heating element, in its transit through the defroster. Such heating element may be of the electrical type, energized by the storage battery or other suitable electrical source, or heated by heat exchange relation with the heated gases of the exhaust of the tractive motor, or in any other suitable manner.

Further features and objects of the invention will be more fully understood from the following detail description and from the following drawings, in which Fig. 1 is a perspective view of a portion of the interior of a closed automobile and of one preferred form of my defroster. The view illustrates also a manner of application of my invention to the windshield of an automobile.

Fig. 4 is a sectional view of my defroster on line 4—4 of Fig. 1.

Fig. 5 is a detail top plan view, partly broken away in horizontal section, of another embodiment of my invention.

Fig. 6 is an end elevation, partly broken away in section on line 6—6 of Fig. 5.

Figure 2:
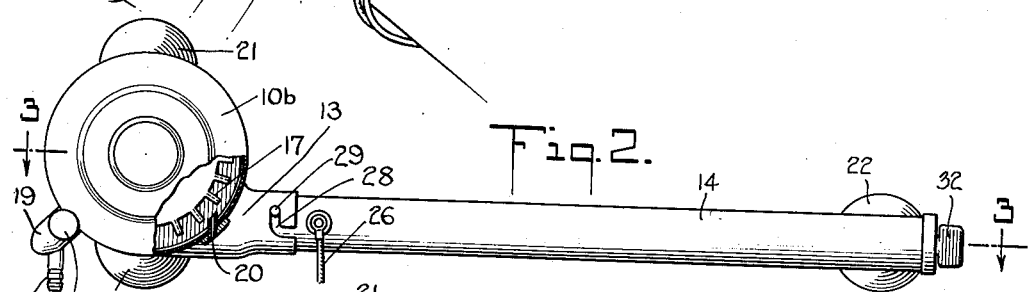
Fig. 2 is a top plan view of the type of defroster embodying my invention indicated in Fig. 1, a portion of the housing of the air motor being broken away for exposing otherwise hidden parts.
Figure 3:
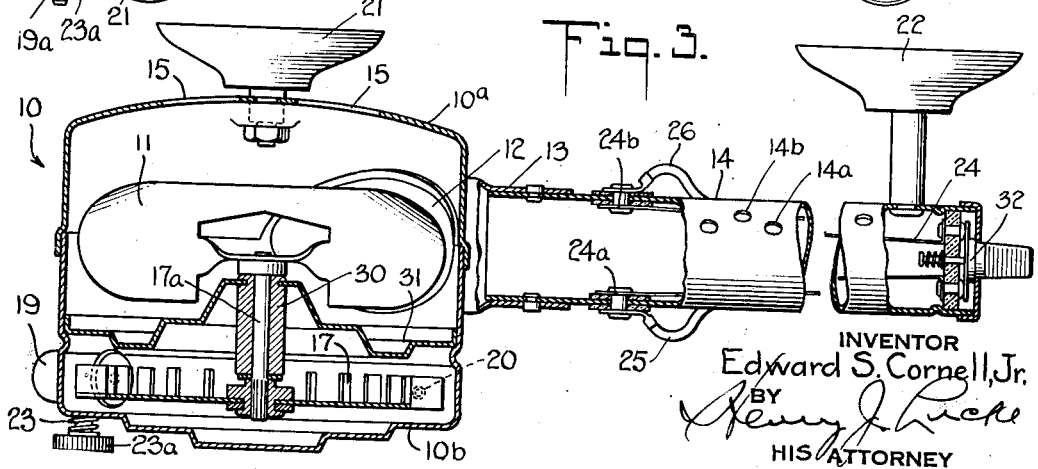
Fig. 3 is a sectional view on line 3—3 of Fig. 2, on an enlarged scale.

Referring to the type of my invention as shown in Figs. 2 and 3, the illustrated embodiment comprises a housing 10 of suitable capacity and desirable contour for enclosing an air compressor illustrated in the form of a rotatably actuated circular, radially multi-blade element 11, in this instance having two blades diametrically related to one another and suitably configurated, housed in the casing portion 10a, the casing portion 10a having a port 12 for the discharge of the compressed air, the port 12 communicating through the nipple 13 with the discharge tube 14. The air ingress opening of the compressor is indicated at 15, and in the form of openings provided by a spider formation at the side of the casing portion 10a adjacent the glass 16, the face of which is to be defrosted.

The compressor 11 is shown driven by the rotor 17 of an air motor housed in the hollow casing portion 10b.

Conveniently, the air motor is actuated under subatmospheric pressure differential effected, as by means of a tubing 18 of rubber or other suitable material, leading to the intake manifold (not shown) of the internal combustion engine serving as the tractive motor of the automobile. In such manner of actuation of the air motor, provision is made at the discharge port of the air motor, see 19, of a nipple 19a for connection thereat of the length of tubing 18. The air inflow port of the air motor is indicated at 20.

The illustrated air motor embodies the general principle of my air motor set out and described in my U. S. Patents Nos. 1,926,527, 1,926,528, both patented September 12th, 1933, and #2,013,087, patented September 3rd, 1935.

As one suitable means for the transit of the compressed air, I may employ the tube 14 which is dimensioned in its interior to maintain pressure and provided with suitable openings for the discharge of the compressed air in predetermined relation to the face of the glass 21 to be defrosted.

In the embodiment shown in Figs. 2 and 3, as also in the embodiment shown in Fig. 5, described more particularly hereinafter, the air discharge openings are arranged in two series, one series of openings 14a being in substantial alignment with one another, and the openings 14b of the other series being in substantial alignment with one another. As illustrated, the openings of the respective series may be spaced substantially uniformly from one another. Preferably, the openings of one series are disposed substantially equidistant from and staggered relative to the openings of the other series.

The defroster may be mounted in any suitable manner relative to the windshield or other glass or other transparent sheet material to be defrosted.

A typical manner of mounting of the defroster is illustrated in the drawings, Figs. 1 to 6, namely, by a pair of suction cups 21 respectively suitably attached to the casing 10 and a similar suction cup attached adjacent the free end of the discharge tube 14.

From the above, it is observed, my defroster possesses unitary assembly, enabling the same to be positioned in operative relation with the face of the glass to be defrosted.

Figure 1:
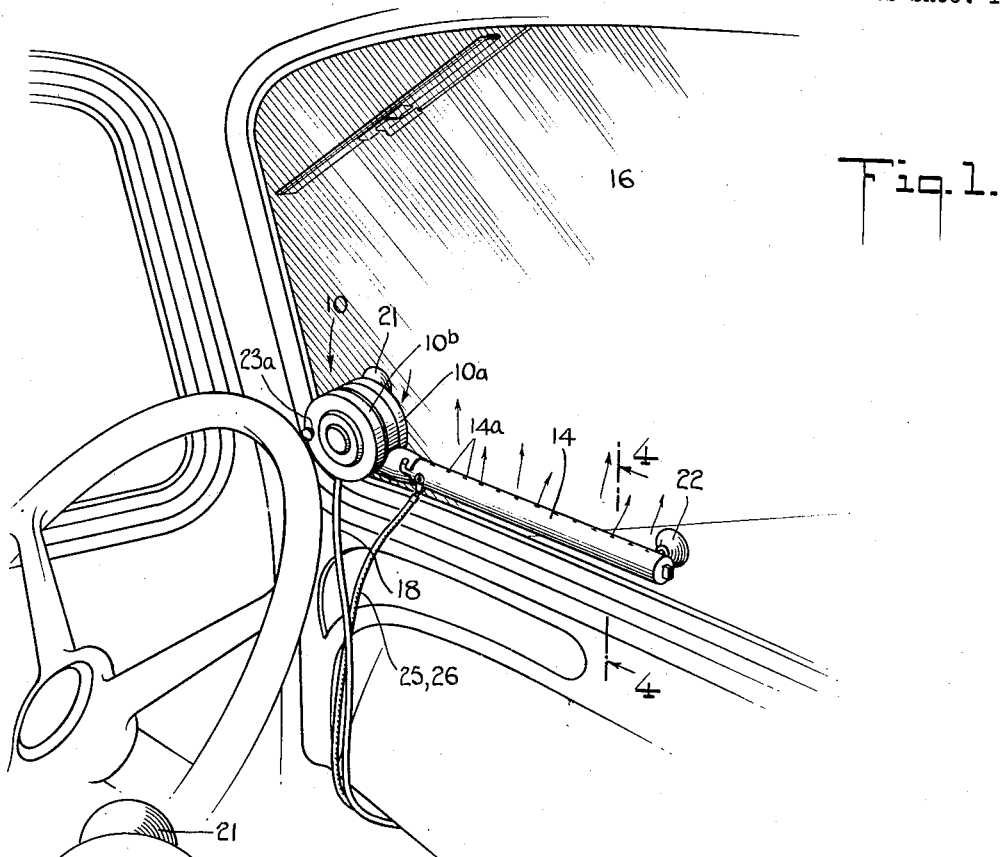

Assuming, as is shown in Fig. 1, the defroster to be positioned in operative relation with the inner face of the windshield glass of the illustrated automobile, the air discharged through the sets of openings 14a, 14b is directed under the projected force initiated by the compressor and maintained by the discharge tube 14, i. e. by the volumetric capacity of the latter relative to the output of the compressor. Optimum results are obtained by locating the discharge openings 14a and/or 14b at one side, in the position of the defroster as shown in Fig. 1 upwardly, of a horizontal plane passing through the longitudinal axis of the discharge tube 14 and between such plane and a vertical plane passing through the longitudinal axis of the discharge tube 14, whereby the air discharged through the stated discharge openings is directed toward and upwardly relative to the portion of the face of the glass to be defrosted. Most favorable results are attained by locating the air ingress opening or openings on the face of the casing housing the compressor coincident with the location of the discharge openings, whereby a positive circulation of the defrosting air currents—see arrows indicated in Figs. 1 and 4—are created in the immediate region of the portion of the glass to be defrosted and at the maximum rate of flow for any given rate of rotation of the compressor, i. e., of the actuating motor.

Desirably, for controlling the rate of actuation of the motor, in the illustrated instance an air motor, I provide the valve 23, having a manipulating head 23a, arranged upon the setting of the same to control the volume of flow of the air through the outlet opening 19 of the air motor. For varied rates of actuation of the compressor, most favorable results are obtained by the above described and the illustrated staggered relationship of a plurality of series of discharge openings, see series 14a, 14b, etc.

Desirably, the discharged air is heated in its transit through the defroster, the increase in temperature of the discharged air currents enhancing the defrosting effect. The heating of the air may be effected by any suitable heating element. In the type of the construction of my defroster shown in Figs. 2 and 3, the heating element, i. e. an electrical resistance 24, is disposed within the discharge tube 14 and suitably insulatedly mounted therein, as shown; the terminals 24a, 24b are respectively connected by the leads 25, 26, to the electrical circuit energized by the storage battery, pursuant to usual practice. A switch, indicated diagrammatically at 32, may be provided for controlling the electric current for "on", "off" and intermediate positions.

In the type of defroster shown in Figs. 5 and 6, the heating element, i. e. an electrical resistance element 27, is disposed in the casing of the compressor, its terminals being connected similarly as the terminals of the electrical resistance 24, like parts being indicated by like reference numbers.

Commercial embodiments of my invention are supplied with or without a heating element. In the construction of my defroster shown in Figs. 2 and 3, the type minus the heating element embodies a "plain" discharge tube 14, i. e. not embodying such heating element 24. Provision is made in the type of construction shown in Figs. 2 and 3 for affording substitution, and naturally for original assembly, of a "plain" discharge tube 14 or of a discharge tube 14 provided with a heating element 24, exemplified by the bayonet joint, or equivalent; the bayonet joint is shown constituted of the bayonet slot 28 and its coacting pin 29, the pin 29 being located in predetermined relation to the aligned discharge openings 14a and/or 14b and the bayonet slot 28 being coordinated with the pin 29 to effect a single position of connection of such discharge tube 14 with the nipple 13, to effect the plane or planes of flow of the projected air, heated or unheated, at an acute angle to the plane of the glass to be defrosted, the acute angle being measured from and in the direction of attack.

If preferred, and as is illustrated in Fig. 5, the discharge tube 14 may be integrally or otherwise permanently secured relative to the nipple 13.

In the stated illustrated embodiments of my invention and equivalent constructions, the portability and its unitary assembly of my defroster enable the same to be readily positioned and removed from position when desired. The securement of suction means to the defroster per se constitutes a further feature of unitary assembly, facilitating ready attachment to any suitable support, inclusive of glass, a portion of which is desired to be defrosted.

A further characteristic of my invention resides in the simplicity of the mutually assembled casing parts enabling the resulting structure to be formed of light-weight but rigid material, of metal or of composition, etc., permitting artistic contour and surface finish while attaining low cost of production.

As one manner of low cost and sturdy construction, the casing 10 may be formed of two casing halves, mating with one another, as appears from Fig. 3, and similarly in Fig. 6, the shaft 17a of the rotor 17 being mounted in a short length of a centrally bored rod 30, serving as a bearing member, and preferably of self-lubricating character, such bearing member being secured in a centrally apertured disk-like septum 31, angularly dished to enhance the strength of its material, and locked in sealing relation with the inner face of the circular side of the casing 10, to subdivide the same into the compressor sub-casing 10a and the motor sub-casing 10b.

Whereas I have described my invention by reference to specific forms thereof, it will be understood that many changes and modifications may be made without departing from the spirit of the invention.

I claim:

1. A unitary defroster for an automobile windshield or like glass device to be defrosted, comprising in combination casing means, detachable means for supporting said casing means in spaced relation to a face of such glass device, the side of said casing means adjacent such glass device being provided with an opening, a motor housed in said casing means, a compressor driven by said motor and housed in said casing means, said opening in the side of said casing means communicating with the portion of said casing means in which said compressor is located, said opening thereby serving as an air intake opening, and discharge means carried by said casing means and communicating with the portion of said casing means in which said compressor is housed and provided with discharge opening means located at the side of said discharge means adjacent to such glass device and directed toward and upwardly relative to such glass device, said discharge means having a volumetric capacity for transmitting air under pressure supplied by said compressor.

2. A unitary defroster for an automobile windshield or like glass device to be defrosted, comprising in combination casing means, detachable means for supporting said casing means in spaced relation to a face of such glass device, the side of said casing means adjacent such glass device being provided with an opening, a motor housed in said casing means, a compressor driven by said motor and housed in said casing means, said opening in the side of said casing means communicating with the portion of said casing means in which said compressor is located, said opening thereby serving as an air intake opening, discharge means carried by said casing means and communicating with the portion of said casing means in which said compressor is housed and provided with discharge opening means located at the side of said discharge means adjacent such glass device and directed toward and upwardly relative to such glass device, and heating means carried by said casing means and disposed in the path of flow of the air interiorly of said casing means, said discharge means having a volumetric capacity for transmitting air under pressure supplied by said compressor.

EDWARD S. CORNELL, Jr.